United States Patent [19]

Müller et al.

[11] Patent Number: 4,525,900
[45] Date of Patent: Jul. 2, 1985

[54] TENSIONING DEVICE, ESPECIALLY FOR LASHING CHAINS

[75] Inventors: Anton Müller, Aalen-Unterkochen; Hubert König; Karl Herdeg, both of Aalen, all of Fed. Rep. of Germany

[73] Assignee: Eisen- und Drahtwerk Erlau Aktiengesellschaft, Aalen, Fed. Rep. of Germany

[21] Appl. No.: 431,603

[22] Filed: Sep. 30, 1982

[30] Foreign Application Priority Data

Oct. 27, 1981 [DE] Fed. Rep. of Germany ....... 3142474

[51] Int. Cl.³ .............................................. F16B 7/12
[52] U.S. Cl. ............................... 24/68 CT; 24/68 CD
[58] Field of Search ....... 248/499; 24/68 CT, 68 CD; 410/99, 101, 103; 254/231, 204, 234

[56] References Cited

U.S. PATENT DOCUMENTS

| 2,198,844 | 4/1940 | Smith | 24/68 CD |
| 2,715,012 | 8/1955 | Huber | 24/68 CD |
| 3,142,877 | 4/1964 | Lesley | 24/68 CT |
| 3,584,835 | 6/1971 | White | 24/68 CD |
| 3,601,864 | 8/1971 | Roberts | 24/68 CT |
| 4,335,489 | 6/1982 | Müller et al. | 24/68 CT |

Primary Examiner—Francis K. Zugel
Assistant Examiner—Peter A. Aschenbrenner
Attorney, Agent, or Firm—Becker & Becker, Inc.

[57] ABSTRACT

A tensioning device, especially for lashing chains. The device includes a tightening, tensioning or adjusting nut with which at least one tensioning spindle can be shifted, which is provided with a link member at the end thereof. An actuating element is non-rotatably connected with the nut for rotating the latter. The actuating element is mounted on the tensioning device subject to the interpostioning of at least one damping element.

22 Claims, 3 Drawing Figures

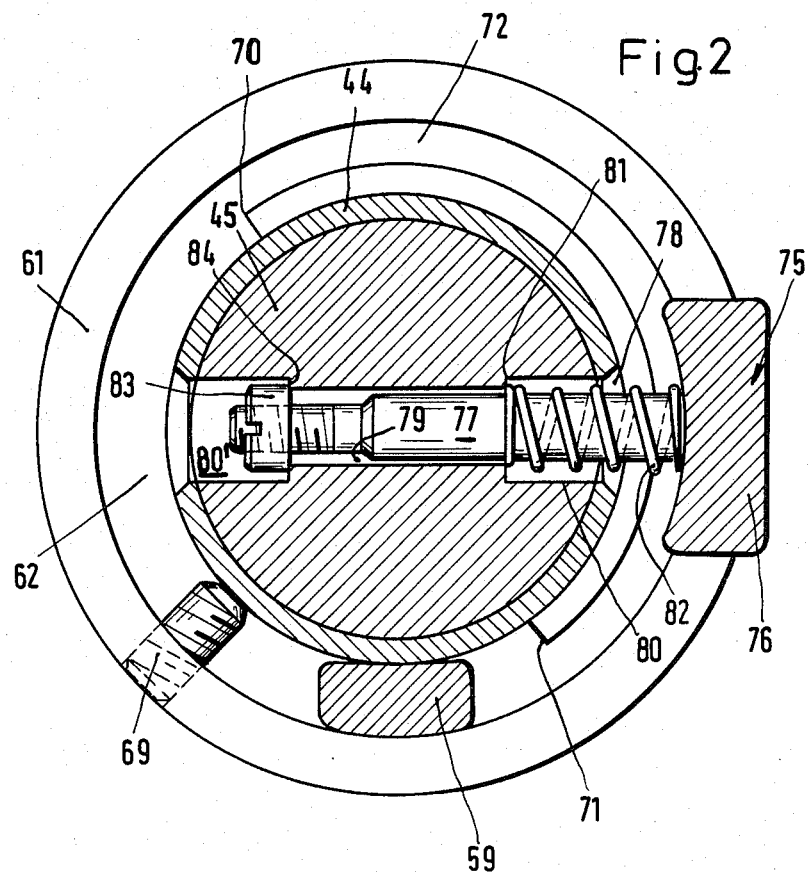
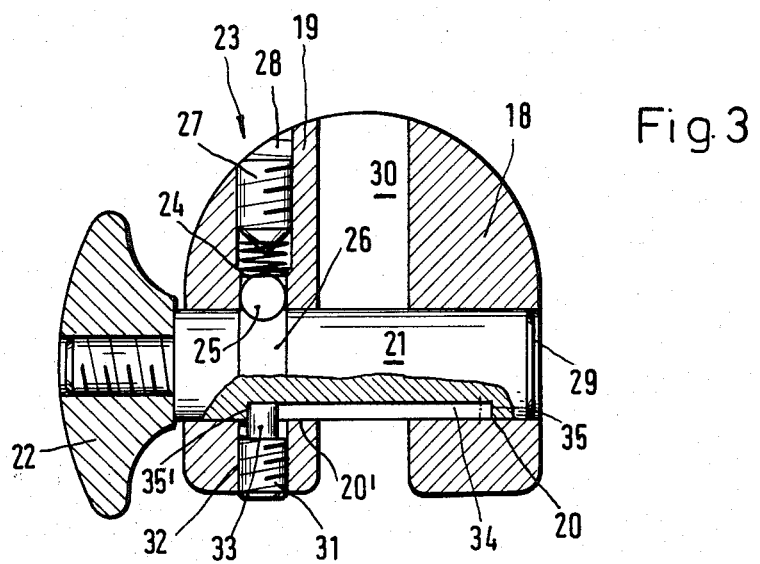

TENSIONING DEVICE, ESPECIALLY FOR LASHING CHAINS

The present invention relates to a tensioning device, especially for lashing chains, with a tightening or adjusting nut with which at least one tensioning spindle can be shifted, which at its end is provided with a link member; an actuating element is non-rotatably connected with the nut for rotating the latter.

Lashing chains, which are used, for example, to lash cargo in transport planes, are tensioned with a tensioning device of this type. The lashing chains are hung or suspended by the link members, which are shifted by means of a double nut so far in a direction toward each other until the lashing chains have the necessary tension. Vibrations occur particularly in flight operations, and can lead to loosening of the actuating element, with which the double nut is rotated for tensioning the lashing chains, so that the tension of the lashing chains decreases.

It is an object of the present invention to provide a tensioning device of the aforementioned general type whereby the actuating element is not shifted by the oscillations or vibrations which occur during use of the tensioning device.

This object, and other objects of the present invention will appear more clearly from the following specification in connection with the accompanying drawings, in which:

FIG. 2 is a cross-sectional view taken along line II—II in FIG. 1; and

FIG. 3 is a cross-sectional view taken along line III—III in FIG. 1.

Figure 1:
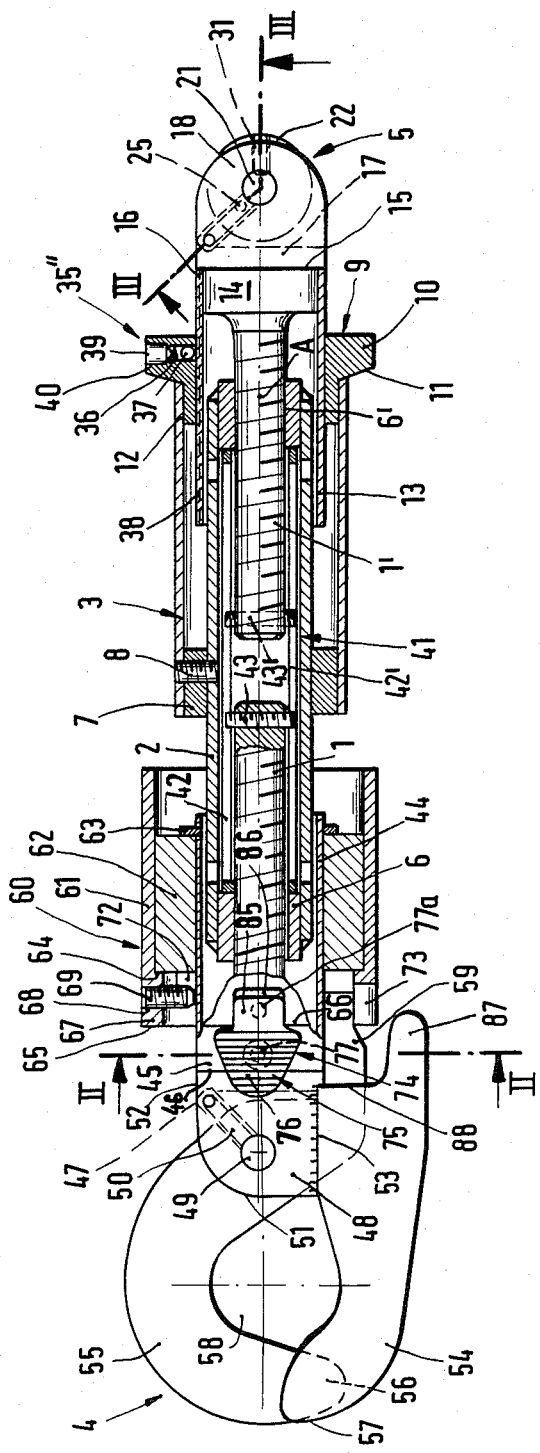
FIG. 1 is a partially longitudinally sectioned view of one embodiment of a tensioning device in accordance with the present invention.

The tensioning device of the present invention is characterized primarily in that the actuating element is mounted on the tensioning device subject to the interpositioning of at least one damping element.

The damping element of the tensioning device of the present invention forms a vibration protection which prevents an automatic rotation of the actuating element as a consequence of these vibrations. Vibrations of extremely low and high frequencies arise especially in aircraft, as the result of which an undamped actuating element could be shifted automatically, so that the double nut would shift both of the tensioning spindles in a direction against each other, thereby reducing the tension of the lashing chains. These vibrations are absorbed by the damping element of the tensioning device according to the present invention, so that the vibrations cannot be effective upon the actuating element. The tension of the lashing chains is thereby maintained during use of the tensioning device, so that the lashed goods are held securely.

According to further specific features of the present invention, the nut, over a part of the length thereof, may be installed or accommodated in a housing; the actuating element may be supported with the damping element upon the housing, and is preferably provided on a support bearing connected with the actuating element, which bearing is preferably a sleeve non-rotatably seated on the housing. The support bearing may have a flange in which the damping element is accommodated, which preferably is a ball which is under the especially adjustable force of a spring.

The actuating element may be a tubular piece which surrounds the tightening or tensioning nut and at one end rests upon the tightening or tensioning nut; the support bearing with the damping element may be provided at the other end of the actuating element, which preferably engages rotatably upon the support bearing.

The housing may be rigidly connected with the link member and with the tensioning spindle; the housing may have a groove extending in the longitudinal direction thereof into which the damping element partially enters, and the length of which preferably corresponds at least to the maximum tensioning path of the tensioning spindle.

The link member may be shiftable into an open position from a closed position, and may have a securing part associated therewith which secures the link member in the closed position and has an arresting or locking position and a release position; the securing part may be secured in the arresting or locking position by at least one locking member. The locking member may be shifted transverse to the axis of the tensioning spindle; preferably, the securing part has a rotatably journalled sleeve which in its mantle has a recess for the locking member, which recess is open especially in the direction toward the end face of the sleeve.

The movable link member may be connected with a housing which partially surrounds the tightening or tensioning nut; the securing part may be mounted on the housing, preferably being axially secured on the housing.

The sleeve of the securing part may be positioned on the housing subject to the interposition of an annular piece which preferably engages against a spring ring or snap ring secured on the housing, and against an internal shoulder of the sleeve.

The securing part may have a stop, which preferably is a pin fastened on the sleeve of the securing part and projecting radially inwardly in the direction toward the housing; at least one counter stop, which is mounted on the housing, may be associated therewith, and is preferably provided on an elevation or curved piece on the outer side of the housing.

The movable link member may have at least one hook part rigidly connected with the tensioning spindle, and one pivotable hook part; at least one bar or crosspiece which projects in the direction toward the housing may be provided, preferably on the rigid hook part.

The pivotable hook part may have an arm which projects beyond the pivot axis, the free end of the arm, in the locking or closed position of the link member, being overlapped by the securing part; the securing part may have an open-edge recess for the arm of the hook part; preferably, the bar of the rigid hook part lies in the pivot path of the arm of the pivotable hook part; and particularly the arm of the pivotable hook part, in the locking position of the movable link member, rests against the inner wall of the sleeve of the securing part.

Referring now to the drawings in detail, the turnbuckle, tensioning or stretching device has two tensioning spindles 1, 1' which can be shifted opposite to each other, with one of the tensioning spindles having right-hand threads, and the other tensioning spindle having left-hand threads. The tensioning spindles 1, 1' are oppositely shifted synchronously by a double nut 2 which can be rotated with an actuating element 3. The tensioning spindles 1, 1', at those ends thereof remote from each other, are respectively provided with a link member 4, 5 into which respectively a chain member of a non-illustrated lashing chain can be placed.

The dual or double nut 2 is constructed as a cylindrical tubular piece into both ends of which a threaded coupling or piece 6, 6' is respectively inserted which is in engagement with the tensioning spindles 1, 1'. The actuating element 3 covers approximately half of the double nut 2; this element 3 is constructed as a tubular piece and, with an intermediate ring 7, engages the double nut 2. The intermediate ring 7 rests against the inner side of the actuating element 3, as well as against the double nut 2, and that end face of the ring 7 which faces the link member 4 is flush with the end face of the actuating element 3. The intermediate ring 7 is non-rotatably connected with the double nut 2 and the actuating element 3 by a threaded pin 8 which passes through the actuating element, the intermediate ring, and the double nut; the two ends of the pin 8 lie in the outer side of the actuating element, and the inner side of the double nut (FIG. 1). The actuating element 3, over the greatest part of its length, is spaced from the double nut 2 as a consequence of the intermediate ring 7.

That end of the tubular actuating element 3 opposite the intermediate ring 7 rests on a support bearing 9 which is constructed like a sleeve and has a flange 10 at one end. As shown in FIG. 1, the actuating element 3 extends as far as to the flange 10, with that end face 11 of the flange 10 which faces the actuating element 3 engaging on a cone-shaped surface. The thickness of the flange 10 thereby decreases radially outwardly. Additionally, there is attained thereby that the end face 12 of the actuating element 3 does not come into engagement against the end face 11 of the flange 10. This assures that the actuating element 3 can be easily rotated on the support bearing 9 for turning the double nut 2.

The support bearing 9 is seated or positioned on a sleeve-like housing 13 which is rigidly connected with the link member 5. The inner diameter thereof is greater than the outer diameter of the double nut 2. When the two tensioning spindles 1, 1' have the smallest spacing from each other, then the housing 13 overlaps one end of the double nut 2 (FIG. 1), so that the double nut 2 is protected against damage. The tensioning spindle 1', which projects out of the housing 13 in the direction toward the link member 4, has the collar 14 at that end thereof located at the link member 5. The collar 14 is fastened to the inner wall of the housing 13, and the end face 15 thereof is flush with the end face 16 of the housing 13. A transverse plate 17 is fastened on the end faces 15, 16 of the collar 14 and of the housing 13; this plate 17 connects two side pieces 18, 19 of the link member 5 with each other (FIG. 3). The end faces of the side pieces 18, 19 are rounded-off nearly semicircularly (FIG. 1), and their maximum width corresponds to the outer diameter of the housing 13. The side pieces 18, 19 respectively have a through-passage bore 20, 20' for a suspension bolt 21 (FIG. 3). The suspension bolt 21 is shiftably mounted within the through-passage bores 20, 20', and has an actuating knob 22 so that it can be easily shifted. A chain member of the lashing chain under consideration can be hung or suspended in the suspension bolt 21. The suspension bolt 21 is secured axially by an arresting mechanism 23 in the closure position thereof illustrated in FIG. 3. The arresting mechanism 23 comprises a detent ball 25 which is under the force of a compression spring 24; this detent ball 25 engages in a peripheral groove 26 of the suspension bolt 21 in the arresting position. The preload of the compression spring 24, and hence the arresting holding force, can be adjusted with a threaded pin 27 which is screwed into a threaded bore 28 of one side piece 19. The bore 28 is located at an angle of approximately 45° to the longitudinal axis A of the tensioning device. The detent ball 25 is pressed against the force of the pressure spring 24 into the threaded bore 28 by pulling the actuating knob 22, thus eliminating the arresting, so that the suspension bolt 21 can be shifted into the release position thereof in which that end face 29 thereof located opposite the actuating knob 22 lies within the through-passage bore 20'. A chain member can then be inserted into the suspension opening 30 of the link member 5 located between the two side pieces 18, 19, and subsequently the suspension bolt 21 can be shifted again into the closure position thereof. The suspension bolt 21 is secured automatically in the closure position in that the detent ball 25 catches in the peripheral groove 26 of the suspension bolt 21 under the force of the spring 24.

A stop 31 is provided in the side piece 19 to prevent the complete removal of the suspension bolt 21 from the link member 5; this stop 31 is formed by a threaded pin which can be screwed into a threaded bore 32 from an end face of the side piece 19. The stop 31 projects with an end piece 33 of reduced diameter into an axially extending groove 34 in the suspension bolt 21. The open position and the closed position of the suspension bolt 21 are determined by the end walls 35, 35' which delimit the groove 34; the stop 31 comes into engagement against these end walls 35, 35' in the two end positions of the suspension bolt 21. In order to be able to completely remove the suspension bolt 21 from the link member 5, the stop 31 need only be screwed so far out of the threaded bore 32 until the end 33 thereof leaves the groove 34.

The actuating element 3 is supported via the support bearing 9 on the housing 13 in a vibration-damped manner. At least one damping device 35" is provided in the support bearing 9; this device prevents the actuating element from rotating automatically during occurrence of oscillations or vibrations, which would shift the tensioning spindles in such a way that the tension produced in the lashing chains with the tensioning device would be reduced. The damping device 35" has a damping ball 37 which is under the force of a compression spring 36, and catches in a longitudinal groove 38 of the housing 13. The tension of the compression spring 36 can be adjusted with a threaded pin 39 which is screwed into a threaded bore 40 in the flange 10 of the support bearing 9. The threaded bore 40 extends radially in the flange 10, and is provided approximately in half of the thickness thereof (FIG. 1). Further damping devices 35" can be provided in the flange 10 of the support bearing 9 according to predetermined vibration protection. The depth of the longitudinal groove 38 is preferably less than half the diameter of the damping ball 37. The damping device 35" assures that during employment of the tensioning device in aircraft, the here frequently arising low and high frequency ranges cannot lead to an unintentional rotation of the actuating element 3, and hence to an opening of the tensioning device. Rather, the vibrations are absorbed by the damping devices. Damping characteristic can be adapted to the actual employment situation by adjusting the prestressing of the compression spring 36.

When the actuating element 3 is rotated, and thereby the tensioning spindles 1, 1' are shifted opposite to each other, the position of the support bearing 9 is not changed. The actuating element 3 can turn on the support bearing 9, while the housing 13, which is rigidly connected with the tensioning spindle 1' via the collar 14, is shifted axially relative to the support bearing 9. The damping ball 37 hereby always catches in the axially extending longitudinal groove 38 of the housing 13.

So that the tensioning spindles 1, 1' during movement thereof are not rotated, which would twist the suspended chain, a protection 41 against rotation is installed in the double nut 2 (FIG. 1). The rotation protection is formed by a sleeve having two axially extending slots 42, 42' which are diagonally opposite to each other and into which the ends of two diametral pins 43, 43' engage which pass through the tensioning spindles 1, 1' in the region of those ends thereof which face one another. As a consequence of the engagement of the diametral pins 43, 43' in the slots 42, 42' of the rotation protection 41, there is assured that the tensioning spindles 1, 1', when shifted by means of the double nut 2, cannot be rotated about their axes, but rather are shifted exclusively axially.

The link member 4 also is provided with a housing 44, which surrounds the adjacent end of the double nut 2 with spacing at least in the position according to FIG. 1. The housing 44 is sleeve-like and is rigidly connected with the link member 4. A collar 45 is fastened on the inner wall of the housing 44 at that end located adjacent to the link member 4; the collar 45 can be constructed in one piece with the tensioning spindle 1. A plate 47 is fastened on that end face 46 of the collar 45 located opposite to the tensioning spindle 1; the plate 47 connects two spaced-apart side pieces 48 of the link member 4 with each other, with only one side piece being visible in FIG. 1. The two side pieces 48 are plate-shaped and have bores which are in alignment with each other for receiving a pivot bolt 49 which is secured in the two arms or side pieces 48 with an arresting mechanism 50 which is constructed and arranged in the same manner as is the arresting mechanism 23 of the other link member 5. The side pieces have an approximately rectangular contour, whereby the end face 51, via a semi-circular curve, merges into a top side 52 which, as seen in the longitudinal section according to FIG. 1, lies in a plane with the outer side of the housing 44. A hook segment 54 is rigidly welded to the underside 53 of each side piece 48; this hook segment 54 forms a part of the link member 4.

A hook part 54 is pivotally mounted on the pivot bolt 49 in the region between the two side pieces 48. The hook part 55 is bent beyond the pivot bolt 49 in a hook shape, and engages with its free end 56 between the free ends 57 of the two hook segments 54, so that in a side view, the hook segments 54 and the hook part 55 overlap each other. The hook segments 54 and the hook part 55 define the limits of a receiving opening 58 for chain members which are to be hung or suspended therein.

The hook part 55 has an arm or projection 59 extending essentially opposite to the hook-shaped bent segment; the hook part 55 can be held with the projection 59 in its closed position according to FIG. 1 by a securing part 60. In the closed position, the projection 59 rests against the outer side of the housing 44.

The securing part 60 has a rotatably journalled sleeve 61 which is supported on the housing 44 via an annular piece 62. The annular piece 62 is located between a spring or snap ring 63 fastened on the housing 44, and an internal shoulder 64 of the sleeve 61. That end face 65 of the sleeve 61 which faces the link member 4 is located at the same level as that end face 66 of the collar 45 which faces away from the link member 4. The inner diameter of the sleeve 61 is greater than the outer diameter of the actuating element 3. The sleeve 61 is provided with a thicker end segment 67 as a consequence of the shoulder 64; the end segment 67 has a bore 68 for a threaded pin 69 which projects radially inwardly into the sleeve 61, and the end of which is preferably located in the outer side of the sleeve 61. The threaded pin 69 is provided approximately halfway along the width of the end segment 67, and forms a stop for the sleeve 61, with which two counter stops 70, 71 are associated (FIG. 2) and are formed by the radially extending end faces of a semicircular, axially extending curved piece or elevation 72 that is provided on the housing 44.

The projection 59 of the hook part 55 projects into the sleeve 61 in the closed position of the link member 4. The engaging segment of the projection 59 is so thick that it engages against the outer wall of the housing 44 as well as against the inner wall of the end segment 67 of the sleeve 61. In the position of the threaded pin 69 illustrated in FIG. 2, the sleeve 61 occupies its closed position in which the projection 59 engages against the inner wall of the sleeve 61. When the sleeve 61 is rotated in such a way that the threaded pin 69 engages against one of the counter stops 70 or 71, then a recess 73 located in the mantle of the sleeve 61 and open toward the end face 65 is located in the region of the projection 59 of the link member 4. The center of gravity of the hook part 55 is such that after release of the projection by the sleeve 61, the hook part 55 automatically pivots into its open position in which the projection 59 is located in the region externally of the sleeve 61. Accordingly, a quick opening of the link member 4 is possible with the securing part 60. To close the link member 4, the hook part 55 must be pivoted in the opposite direction about the joint bolt 49 into the position illustrated in FIG. 1; subsequently, the sleeve 61 again must be rotated in such a way that the threaded pin 69 is located in the region between the counter stops 70, 71. Then the projection 59 engages the inner wall of the sleeve 61, so that the hook part 55 is secured against pivoting.

A locking device 74 is provided for the securing part 60 so that the sleeve 61 cannot be rotated unintentionally into the open position thereof. The locking device 74 has a push-button 75 which is provided with an actuating part 76 located externally of the sleeve 61; the actuating part 76 has an approximately trapezoidal contour. The actuating part 76 lies externally of the housing 44, and projects with a bolt 77 provided on its underside (FIG. 2) through an opening 78 in the housing 44 into a through-passage bore 79 of the collar 45. The through-passage bore 79 at both of its ends respectively is provided with a section 80, 80' which is wider in diameter and extends to the periphery of the collar 45. A shoulder surface 81 is formed at the transistion from the wider bore segment 80 into the narrower part of the through-passage bore 79. One end of a compression spring 82 is supported on the shoulder surface 81, and the other end of the spring 82 engages against the underside of the actuating part 76 of the push-button 75. The spring 82 surrounds the bolt 77, and presses the push-button 75 in a direction toward the locked position thereof.

A nut 83 is screwed onto the free end of the bolt 77. The nut 83 forms an end stop for the push-button 75, and prevents the push-button 75 from being pressed out of the through-passage bore 79 under the force of the spring 82. The nut 83 engages a shoulder surface 84 provided at the transition from the wider segment 80' into the narrower segment of the through-passage bore 79 under the force of the pressure spring 82. In the locked position of the push-button 75, the nut 83 engages a shoulder surface 84 provided at the transition from the wider segment 80' into the narrower segment of the through-passage bore 79.

The push-button 75 has a locking part 85 (FIG. 1) which has a rectangular outline and is made in one piece with the actuating part 76. In the locked position, the locking part 85 projects into a likewise rectangular recess 86 which is open in a direction toward the end face 65 of the sleeve 61. The width of the recess 86 in the circumferential direction of the sleeve 61 corresponds essentially to the corresponding width of the locking part 85, so that the sleeve 61 is held free of play in the locked position.

The locking device 74 satisfactorily and reliably prevents the securing part 60 from being unintentially rotated into the open position thereof. This assures that the link member 4 cannot open unintentionally.

It is necessary to press the push-button 75 against the force of the spring 82 in the direction toward the housing 44 in order to open the link member 4, whereby the locking part 85 passes out of the recess 86 of the sleeve 61 and then lies in the region between the sleeve 61 and the housing 44. The sleeve 61 can now be rotated so far until the threaded pin 69 comes into engagement at one of the two counter stops 70, 71. The recess 73 at one end face of the sleeve 61 then lies opposite the projection 59, so that the hook part 55 can pivot about the bolt 49 into its release or non-fixed position. The push-button 75 can be released hereby since the locking part 85 comes into engagement against the inner wall of the sleeve 61 under the force of the spring 82. The hook part 55 is pivoted back after the chain member is hooked-in or unhooked and the sleeve 61 is rotated back into the locking position. As soon as the recess 86 comes into the region of the locking part 85 of the push-button 75, the locking part 85 automatically springs into the recess 86 under the force of the spring 82, thus securing the sleeve 61 fixed against rotation. Since the nut 83 can be adjusted on the bolt 77, the locking part 85 can be adjusted accurately in a simple manner in relation to the sleeve 61, so that the locking part 85 in the locking position lies satisfactorily in the recess 86 of the sleeve 61.

The hook segments 54 are connected with each other by a bar or crosspiece 87 on that side thereof which faces the sleeve 61 (FIG. 1). The bar 87 extends from one back side 88 of the hook segments 54 (located at the level of the plate 47 and projecting nearly at right angles from the underside 53 of the side piece 48) to the level of the end face 65 of the sleeve 61. The bar 87 is radially spaced from the sleeve 61, and serves to prevent an injury, during fast opening of the link member 4, by the automatically pivoting hook part 55. For instance, when the hooked or suspended chain is still under tension during fast opening of the link member 4, then the hook part 55, under certain circumstances, may be pivoted with great force into the open position thereof, whereby the projection 59 in FIG. 1 is pivoted downwardly. The bar 87 lies in the path of movement of the projection or arm 59, and prevents this projection or arm 59 from pivoting downwardly beyond the hook segments 54.

The securing part 60 is seated or positioned axially secured on the housing 44, and is taken along during the axial movement in the tensioning spindle 1. Accordingly, no relative shifting occurs between the securing part 60 and the link member 4, so that the protection is assured by the bar 87 in every tensioning position.

The push-button 75, as shown in FIG. 1, besides being provided with the bolt 77, is additionally provided with a pin 77a which projects at right angles from the underside of the locking part 85. The pin 77a slidably engages in a bore of the tensioning spindle 1. The pin 77a assures that the push-button 75 can be pressed free of tilting, even when the chains hung or suspended in the tensioning device are subjected to a high tension.

The push-button 75 naturally also can be provided without the pin 77a. However, the push-button 75 with the pin 77a has the advantage that the securing part 60 can be released satisfactorily for fast opening of the tensioning device.

The present invention is, of course, in no way restricted to the specific disclosure of the specification and drawings, but also encompasses any modifications within the scope of the appended claims.

What we claim is:

1. A tensioning device especially for lashing chains used for example to lash goods of cargo in transport planes and vehicles subject to vibrations that can cause loosening thereof, including at least one tensioning spindle having at least one end and having an axial direction; a link member respectively provided at said end of said tensioning spindle; a housing arranged co-axially with respect to said tensioning spindle that extends at least partially therein; a nut for adjustably shifting said at least one tensioning spindle and extending co-axially at least partially into said housing; a support bearing upon which said housing is arranged; and actuating element which is supported on said bearing and is non-rotatably connected with said nut for rotation of said nut; and the improvement therewith which comprises:
    at least one damping element that absorbs vibrations and is connected with said actuating element; and
    a spring means that applies force thereof to said damping element and that is pressed against said housing transverse to the axial direction of said spindle, said tensioning device and said damping element therewith maintaining tension of the lashing chains connected therewith so that the lashed goods are held securely.

2. A tensioning device according to claim 1, which includes said housing connected to said tensioning spindle and its link member; said actuating element, with said damping element, being supported on said housing.

3. A tensioning device according to claim 2, which includes said support bearing in the form of a sleeve which is non-rotatably mounted on said housing, said support bearing being interposed between said actuating element and said housing.

4. A tensioning device according to claim 3, in which said support bearing is provided with a radially outwardly projecting flange includes a bore in which said damping element is installed.

5. A tensioning device according to claim 4, in which said damping element is formed as a ball which is biased under the force of said spring means.

6. A tensioning device according to claim 4, in which said actuating element is a tubular piece which at least partially surrounds said nut; one end of said tubular piece rests on said nut; said support bearing, with said damping element, being arranged at an end of said tubular piece spaced therefrom.

7. A tensioning device according to claim 6, in which that end of said tubular piece remote from said nut is rotatably supported on said support bearing.

8. A tensioning device according to claim 2, in which said housing is connected to said tensioning spindle and its link member; and in which said housing is provided with a longitudinally extending groove having length in which said damping element partially enters axially thereof.

9. A tensioning device according to claim 8, in which the length of said groove corresponds at least to length of maximum tensioning distance of said tensioning spindle therein.

10. A tensioning device according to claim 1, in which one of said link members is a movable link member which is adapted to be shifted from a blocking position into an un-blocked position; which includes a securing part provided with said movable link member for securing same in the blocking position thereof, said securing part having a fixed position and a non-fixed position; and which includes at least one locking part for holding said securing part in the fixed position.

11. A tensioning device according to claim 10, in which said locking part is adapted to be shifted transverse to the axis of the tensioning spindle of said movable link member.

12. A tensioning device according to claim 11, in which said securing part includes a rotatably journalled sleeve, having a recess axially therein for receiving said locking part, said recess being open toward said movable link member.

13. A tensioning device according to claim 12, which includes a housing which is connected to said movable link member and partially surrounds said nut; and in which said securing part is mounted on said housing.

14. A tensioning device according to claim 13, in which said securing part is axially secured on said housing.

15. A tensioning device according to claim 13, which includes an annular support piece interposed radially between said housing and said sleeve of said securing part.

16. A tensioning device according to claim 15, which includes a snap ring secured on said housing; said sleeve having a radially inwardly directed shoulder, said annular piece engaging against said snap ring and said shoulder.

17. A tensioning device according to claim 13, in which said securing part is provided with a stop; and which includes at least one counter stop provided with said housing and engageable relative to said stop.

18. A tensioning device according to claim 17, in which said stop is a pin which is mounted in said sleeve of said securing part and projects radially inwardly toward said housing; and which includes an axially extending curved piece on the outer side of said housing, said at least one counter stop being provided thereon.

19. A tensioning device according to claim 13, in which said movable link member includes at least one hook part which is rigidly connected with said tensioning spindle, and at least one hook part which is pivotably connected therewith; and which includes at least one bar which is connected to one of said hook parts and projects toward said housing, said bar being radially spaced from said sleeve and serving to protect against possible injury during relative pivoting of said hook parts in every tensioning position so that relative shifting between said securing part and said link member is prevented.

20. A tensioning device according to claim 19, in which said bar is connected to said rigidly connected hook part.

21. A tensioning device according to claim 19, in which said pivotable hook part is provided with an arm having a free end which projects beyond the pivot axis, with that free end of said arm remote from said pivot axis being overlapped by said securing part in said blocking position of said movable link member; and in which said securing part is provided with a recess for receiving said arm, so that in said blocking position of said movable link member, said arm of said pivotable hook part is able to rest against the inner wall of said sleeve of said securing part.

22. A tensioning device according to claim 21, in which said bar is connected to said at least one rigidly connected hook part, and lies in the pivot path of said arm of said pivotable hook part.

* * * * *